United States Patent
Motobayashi (10) Patent No.: US 9,583,941 B2
(45) Date of Patent: Feb. 28, 2017

(54) POWER CONNECTION CONTROL SYSTEM AND METHOD

(71) Applicant: Toshihiko Motobayashi, Tokyo (JP)

(72) Inventor: Toshihiko Motobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 494 days.

(21) Appl. No.: 14/000,565

(22) PCT Filed: Sep. 26, 2012

(86) PCT No.: PCT/JP2012/074732
§ 371 (c)(1),
(2) Date: Aug. 20, 2013

(87) PCT Pub. No.: WO2013/047595
PCT Pub. Date: Apr. 4, 2013

(65) Prior Publication Data
US 2014/0052306 A1 Feb. 20, 2014

(30) Foreign Application Priority Data
Sep. 26, 2011 (JP) ................. 2011-209371

(51) Int. Cl.
*H02J 3/00* (2006.01)
*H02J 9/06* (2006.01)

(52) U.S. Cl.
CPC ............ *H02J 3/006* (2013.01); *H02J 9/06* (2013.01); *Y10T 307/344* (2015.04); *Y10T 307/469* (2015.04)

(58) Field of Classification Search
None
See application file for complete search history.

(56) References Cited

U.S. PATENT DOCUMENTS 4,381,457 A * 4/1983 Wiles ................. G06F 1/30
307/64
6,167,389 A * 12/2000 Davis ................ G06Q 50/06
700/11

(Continued)

FOREIGN PATENT DOCUMENTS

| JP | 09-135577 A | 5/1997 |
| JP | 2003-092844 A | 3/2003 |

(Continued)

OTHER PUBLICATIONS

Communication dated May 27, 2015 from the European Patent Office in counterpart European Application No. 12836086.4.

(Continued)

*Primary Examiner* — Christopher E Everett
(74) *Attorney, Agent, or Firm* — Sughrue Mion, PLLC (57) ABSTRACT

For each of consumers, a connection control apparatus is provided that includes an opening/closing device capable of connecting or disconnecting an electric power system and a consumer, that, when a power outage occurs in the electric power system, disconnects the electric power system and the consumer from each other by the opening/closing device at a command from an outage management apparatus or the like, and that connects the electric power system and the consumer to each other by the opening/closing device upon receiving a command from the outage management apparatus or the like at the time of restoration from the power outage. A power supply control apparatus supplies electric power from energy provision equipment to electrical appliances during a power outage in the electric power system.

24 Claims, 7 Drawing Sheets

(56) References Cited

U.S. PATENT DOCUMENTS

| | | | |
|---|---|---|---|
| 6,680,547 B1 | 1/2004 | Dailey | |
| 7,015,599 B2* | 3/2006 | Gull | H02J 3/005 307/64 |
| 7,197,378 B2 | 3/2007 | Sato et al. | |
| 8,938,323 B2* | 1/2015 | Lee | G06F 1/30 700/291 |
| 2004/0133314 A1* | 7/2004 | Ehlers | F24F 11/0012 700/276 |
| 2004/0207264 A1 | 10/2004 | Sato et al. | |
| 2007/0228835 A1* | 10/2007 | Varzhabedian | H02J 7/027 307/66 |
| 2008/0039980 A1* | 2/2008 | Pollack | B60L 11/1824 700/295 |
| 2008/0215263 A1* | 9/2008 | Flohr | H02J 3/14 702/62 |
| 2008/0296975 A1* | 12/2008 | Shakespeare | H02J 9/065 307/66 |
| 2009/0150100 A1* | 6/2009 | Pifer | H02J 9/06 702/62 |
| 2010/0017045 A1* | 1/2010 | Nesler | B60L 11/1824 700/296 |
| 2010/0142237 A1* | 6/2010 | Yuan | H02J 3/386 363/97 |
| 2010/0225167 A1* | 9/2010 | Stair | H02J 3/14 307/29 |
| 2010/0235010 A1* | 9/2010 | Cooper | H02J 3/14 700/295 |
| 2011/0016063 A1* | 1/2011 | Pollack | B60L 11/1824 705/412 |
| 2011/0133558 A1* | 6/2011 | Park | H02J 3/32 307/66 |
| 2011/0148199 A1* | 6/2011 | Besore | H02J 3/14 307/41 |
| 2011/0291479 A1* | 12/2011 | Lee | H02J 3/32 307/43 |
| 2012/0029713 A1* | 2/2012 | Spicer | H02J 3/14 700/291 |
| 2012/0046798 A1* | 2/2012 | Orthlieb | H02J 3/32 700/297 |
| 2012/0123604 A1* | 5/2012 | Littrell | H01M 10/44 700/295 |
| 2012/0206108 A1* | 8/2012 | Waring | H02J 3/14 320/137 |

FOREIGN PATENT DOCUMENTS

| | | |
|---|---|---|
| JP | 2004-088824 A | 3/2004 |
| JP | 2004357337 A | 12/2004 |
| JP | 2006-311707 A | 11/2006 |
| JP | 2008-011612 A | 1/2008 |
| JP | 2008-187837 A1 | 8/2008 |
| JP | 200911150 A | 1/2009 |

OTHER PUBLICATIONS

Communication dated Jun. 28, 2016, issued by the Japan Patent Office in corresponding Japanese Application No. 2013-162287.

Communication dated Dec. 13, 2016 from the Japanese Patent Office in counterpart application No. 2013-162287.

* cited by examiner

POWER CONNECTION CONTROL SYSTEM AND METHOD

CROSS REFERENCE TO RELATED APPLICATIONS

This application is a National Stage of International Application No. PCT/JP2012/074732 filed Sep. 26, 2012, claiming priority based on Japanese Patent Application No. 2011-209371 filed Sep. 26, 2011, the contents of all of which are incorporated herein by reference in their entirety.

TECHNICAL FIELD

The present invention relates to a power connection control system and a method including energy provision equipment that can supply electric power to loads.

BACKGROUND ART

In recent years, the global warming problem has become noticeable; awareness about the environment on the part of nations, corporations and consumers has grown; and there has been an increasing trend to reduce the emission of global warming gas ($CO_2$) that accompanies the consumption of energy. Therefore, renewable power sources, such as solar power generation (photovoltaic generation) and wind power generation (a wind farm), which do not generate global warming gas emissions, and which have limited adverse effects on the environment, and which generate power using natural energy, are attracting attention.

The amount of power generation in a renewable power source varies depending on the weather. Therefore a renewable power source is ordinarily operated by being linked to an electric power (distribution) system so that the quality of power supplied to a consumer is maintained. In that case, surplus power generated by the renewable power source and not consumed by the consumer is provided to the electric power system (reverse power flow) through a power line (transmission line). However, in a case where the consumer has such a contract with the electric power company that manages the electric power system such that there will not be any reverse power flow, the renewable power source is disconnected from the electric power system when surplus power is produced in the renewable power source. In some cases, a renewable power source is used with a storage battery to limit wasteful discarding of generated surplus electric power and to stabilize the amount of electric power supplied to a consumer. A consumer is a unit such as a house, a corporation, a building or a factory connected to an electric power system, which may also be an individual, a juridical person, a group, or the like who has a power-demand-supply contract with an consumption-supply contract with an electric power company. "Consumer" referred to in the following denotes both a unit such as the above-mentioned house, corporation, building or factory connected to an electric power system and an individual, a juridical person, a group, or the like who manages the house, corporation, building or factory, or denotes one from among the unit and the person or group managing the unit.

When supply of electric power from the electric power system to the consumer is stopped by an accident or the like (in a power outage), there is a need to stop the operation of the renewable power source operated by being linked to the electric power system or to disconnect the renewable power source from the electric power system in order to prevent the above-described reverse power flow. This is because if a reverse power flow from the renewable power source exists, voltage is generated in the power distribution line even during power outage to cause difficulty in ascertaining the cause of the occurrence of the power outage, and because the risk of an electric shock accident, a malfunction of electric facilities, or the like is increased due to access to the electric power system after recognition of the power outage.

On the other hand, it is desirable for the consumer to be able to use, just during the power outage, electric power generated by the renewable power source held by the consumer or electric power accumulated in a storage battery. Therefore a power conditioner that enables the renewable power source to be connected to the electric power system ordinarily has a function to disconnect the renewable power source from the electric power system (e.g., a circuit breaker). When the renewable power source is not connected to the electric power system, electric power can be supplied from an emergency receptacle provided on the power conditioner to a load by activating an autonomous operation function.

Patent Literatures 1 and 2, for example, describe configurations for supplying, during a power outage, electric power generated by a generator for private power generation or a gas cogeneration system to loads (electrical appliances) provided on the consumer side, each of which includes no renewable power source used in generation facilities.

Patent Literature 1 describes receiving online an expected restoration time from an electric power company in a power outage, and selecting loads (electrical appliances) to which electric power is to be supplied from a generator for private power generation according to whether the time taken to complete power restoration from the outage is short or long.

Patent Literature 2 describes accepting, upon the occurrence of a power outage, a predicted outage time period and predicted power demand fluctuation values with respect to loads, input by an operator, controlling the amount of power generation in a gas cogeneration system and the amount of electricity accumulated in a storage battery and the amount of discharge from the storage battery based on the predicted time and the predicted values, and selecting loads to which electric power is to be supplied.

As described above, when supply of electric power from the electric power system to the consumer is stopped (in a power outage), there is a need to stop operation of the renewable power source that is operated by being linked to the electric power system or to disconnect the renewable power source from the electric power system to prevent a reverse power flow.

Therefore, the power conditioner is ordinarily provided with a circuit breaker or the like for disconnecting the renewable power source from the electric power system when a power outage is detected. When the renewable power source is not connected to the electric power system, electric power can be supplied from the emergency receptacle to loads.

In ordinary cases, selection of the autonomous operation function is not automatically made when a power outage occurs, and there is a need for the consumer to activate the autonomous operation function. Also when the linking operation is performed by again linking the renewable power source to the electric power system at the time of power restoration from the outage, there is also a need for the consumer to stop the autonomous operation function and to link the renewable power source to the electric power system. Thus, there is a problem that the operation to change the operating mode of the renewable power source is burdensome.

RELATED ART LITERATURE

Patent Literature

Patent Literature 1: Japanese Patent Laid-Open No. 2003-092844
Patent Literature 2: Japanese Patent Laid-Open No. 2008-011612

SUMMARY

An object of the present invention is to provide a power connection control system and method to facilitate switching of the autonomous operation function with the energy provision equipment that a consumer owns when a power outage occurs in the electric power system.

A power connection control system for achieving the above-described object according to an exemplary aspect of the present invention is a power connection control system provided with energy provision equipment to be linked to an electric power system, the energy provision equipment that can supply electric power to electrical appliances that a consumer owns, the power connection control system including:

a connection control apparatus that includes an opening/closing device capable of connecting or disconnecting the electric power system and the consumer, and that, when a power outage occurs in the electric power system, disconnects the electric power system and the consumer from each other by the opening/closing device at a command received from the outside; and a power supply control apparatus that, when the power outage occurs in the electric power system, supplies electric power from the energy provision equipment to the electrical appliances.

Alternatively, the power connection control system according to an exemplary aspect of the present invention is a power connection control system provided with energy provision equipment to be linked to an electric power system, the energy provision equipment that can supply electric power to electrical appliances that a consumer owns, the power connection control system including:

an outage management apparatus that, when a power outage occurs in the electric power system, transmits a parallel-off command to disconnect the electric power system and the consumer from each other and, at the time of power restoration from the power outage, transmits a linkage command for linking the electric power system and the consumer to each other;

a connection control apparatus that includes an opening/closing device capable of connecting or disconnecting the electric power system and the consumer, and that, when the power outage occurs in the electric power system, disconnects the electric power system and the consumer from each other by the opening/closing device at the parallel-off command from the outage management apparatus; and a power supply control apparatus that, when the power outage occurs in the electric power system, supplies electric power from the energy provision equipment to the electrical appliances.

On the other hand, a power connection control method according to an exemplary aspect of the present invention is a power connection control method for disconnecting, from an electric power system, energy provision equipment that can supply electric power to electrical appliances that a consumer owns, the method including:

providing an opening/closing device that connects or disconnects the electric power system and the consumer;

a control apparatus disconnecting, when a power outage occurs in the electric power system, the electric power system and the consumer from each other by the opening/closing device at a command received from the outside; and a first computer supplying electric power from the energy provision equipment to the electrical appliances during the power outage in the electric power system.

EXEMPLARY EMBODIMENT

The present invention will be described with reference to the drawings.

Figure 1:
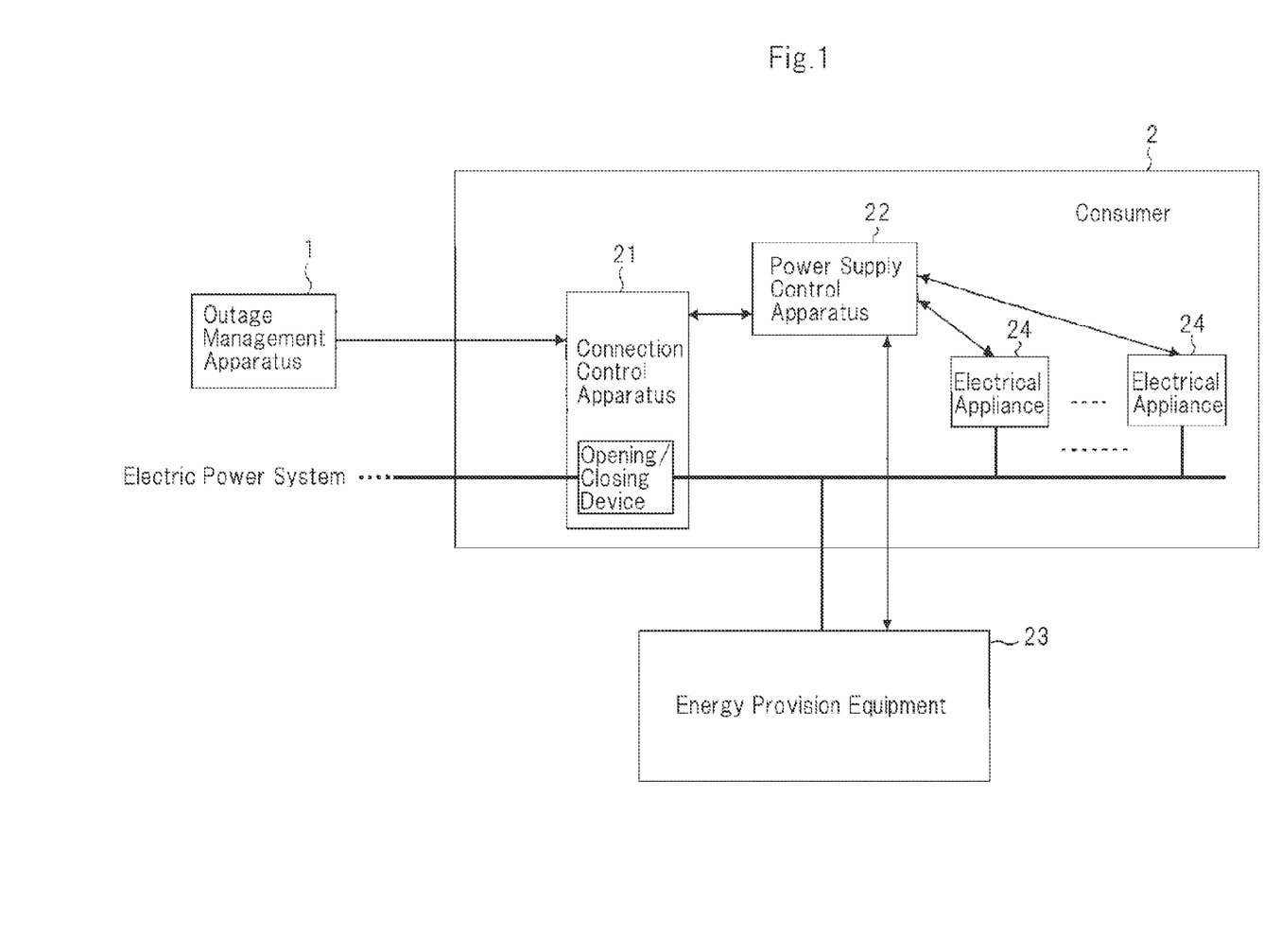
FIG. 1 is a block diagram showing an example of a configuration of a power connection control system according to the present invention.
Figure 2:
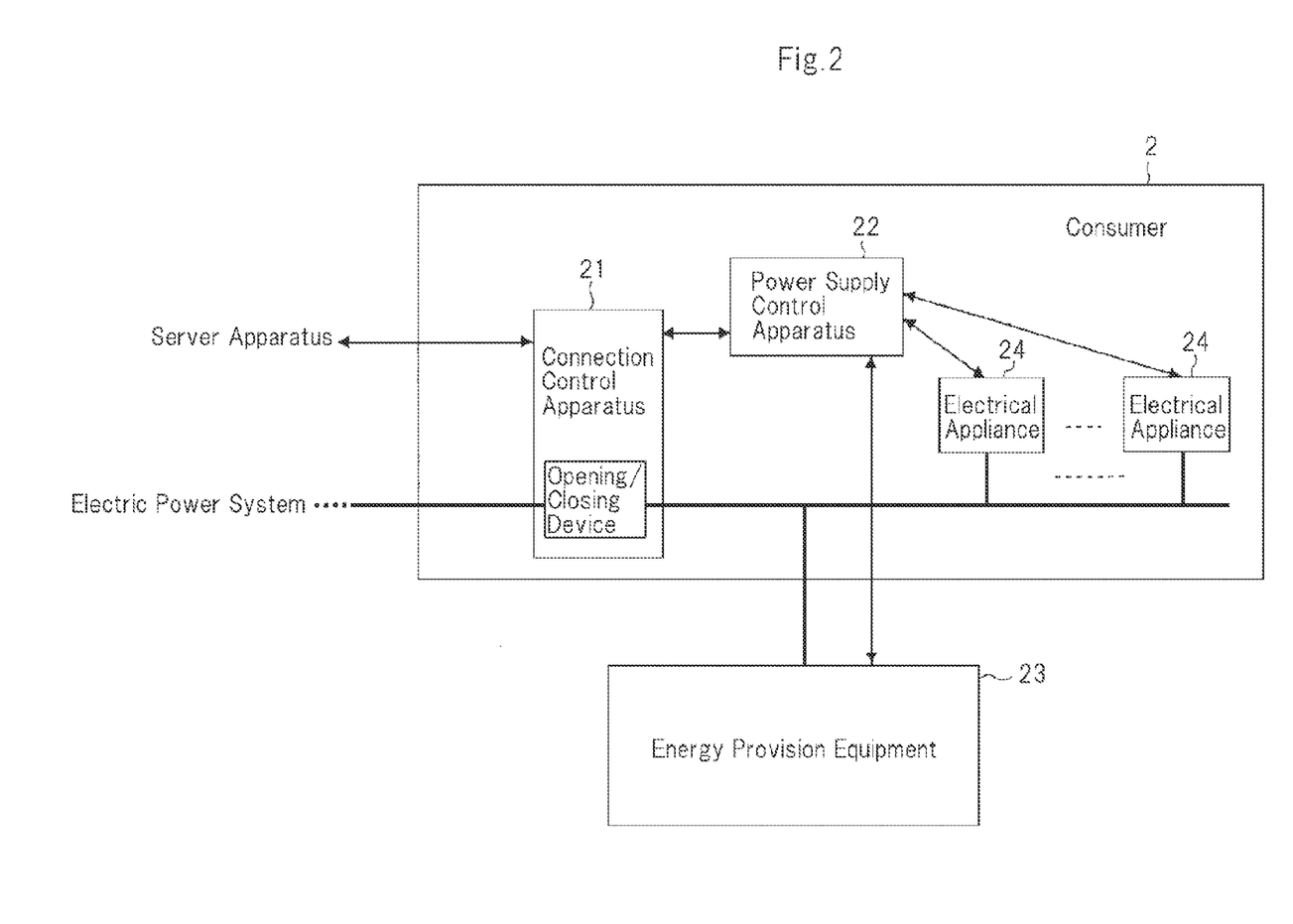
FIG. 2 is a block diagram showing an example of a configuration of a consumer shown in FIG. 1.

FIG. 1 is a block diagram showing an example of a configuration of a power connection control system of the present invention. FIG. 2 is a block diagram showing an example of a configuration of a consumer shown in FIG. 1. FIG. 2 is a diagram showing the configuration of consumer 2 by extracted from the power connection control system shown in FIG. 1.

As shown in FIG. 1, in the power connection control system of the present invention, consumer 2 provided with energy provision equipment that can supply electric power to loads (electrical appliances) is connected to outage management apparatus (second computer) 1 that manages an electric power system when a power outage occurs, and that is provided in an electric power company. While FIG. 1 shows an example in which one consumer 2 is connected to the electric power system and outage management apparatus 1, a plurality of consumers 2 are connected to the electric power system and outage management apparatus 1 in actuality.

As shown in FIGS. 1 and 2, consumer 2 has connection control apparatus 21, power supply control apparatus (first computer) 22, energy provision equipment 23 and one or a plurality of electrical appliances (loads) 24. Energy provision equipment 23 and electrical appliances 24 are ordinarily connected to power wiring in the consumer 2 through a distribution panel not illustrated. The distribution panel includes a well-known earth leakage circuit breaker and a molded-case circuit breaker and distributes electric power supplied from the electric power system or energy provision equipment 23 to electrical appliances 24 provided in the consumer's house or building. Consumer 2 may be capable of communicating various sorts of information to and from a server apparatus or the like managed, for example, by the electric power company through connection control apparatus 21, as shown in FIG. 2. The apparatus connected to connection control apparatus 21 is not limited to outage management apparatus 1 shown in FIG. 1. While FIGS. 1 and 2 show a configuration example in which energy provision equipment 23 is provided outside consumer 2 (outside the house or building) and in which all electrical appliances 24 are provided in consumer 2 (in the house or building), energy provision equipment 23 may be provided in consumer 2 and some of electrical appliances 24 may be provided outside consumer 2.

Electrical appliances 24 are any of various appliances that consumer 2 owns consuming electric power, including home appliances such as an electric light, an air conditioner, a television receiver, a refrigerator, a washing machine, a microwave oven, a rice cooker and a cleaner, office appliances such as a copying machine, a facsimile transmitter and a computer, and factory appliances such as machine tools and manufacturing machines.

On each of electrical appliances 24 in the present exemplary embodiment, power detection means for measuring the power consumption of the appliance and information communication means for transmitting measured values from the power detection means to power supply control apparatus 22, for example, are mounted. As power detection means, a well-known electronic-type electric-power sensor with a current transformer and a voltage transformer, for example, can be used. As information communication means, Zigbee (trademark), WiFi (Wireless Fidelity), UWB (Ultra Wide Band), Bluetooth (trademark) or the like, for example, may be used in the case of using wireless communication, and Ethernet (trademark), PLC or the like may be used in the case of using wired communication. The power consumption of electrical appliances 24 may be measured, for example, with respect to each of receptacles or each molded-case circuit breaker instead of being measured with respect to each electrical appliance 24. In such a case, power detection means and information communication means may be provided that correspond to each receptacle or molded-case circuit breaker instead of being mounted on each electrical appliance 24. In a case where some of electrical appliances 24 are each an appliance called a smart home appliance, the appliance called a smart home appliance is ordinarily provided with power detection means and information communication means. In such a case, the power consumption of each smart home appliance may be transmitted from the smart home appliance at the request of power supply control apparatus 22 or periodically at predetermined intervals. For the power consumption of each electrical appliance 24, the rated power consumption of electrical appliance 24 may be used. The power detection means and the information communication means may be provided according to need. It is not necessarily required that the power detection means and the information communication means be provided on all electrical appliances 24 that consumer 2 owns.

Energy provision equipment 23 is a renewable power source such as a well-known solar power generator or a wind power generator, a storage battery, or the like. Energy provision equipment 23 is not limited to a renewable power source or a storage battery. As energy provision equipment 23, a well-known distributed power source such as a fuel cell, a generator using fossil energy or a cogeneration system may be used.

Energy provision equipment 23 is connected to the above-mentioned distribution panel through a generally well-known power conditioner (not illustrated) to be linked to the power wiring in consumer 2. The power conditioner is a device that enables linkage of electric power generated in the renewable power source or the distributed power source to the electric power system, and that controls the amount of power generation in the renewable power source or in the distributed power source as required. If energy provision equipment 23 is a storage battery, the power conditioner has a function to control charge and discharge of the storage battery. The power conditioner may only be connected to energy provision equipment 23 and may be provided in or outside of energy provision equipment 23.

Energy provision equipment 23 in the present exemplary embodiment includes power measuring means for measuring the amount of output of electric power and information communication means for transmitting the measured value from the power measuring means to power supply control apparatus 22 and for communicating various sorts of information (including command signals or the like) to and from power supply control apparatus 22. The value of the amount of output of electric power from energy provision equipment 23 measured by the power measuring means is transmitted to power supply control apparatus 22. The information communication means transmits the measured value from the power measuring means to power supply control apparatus 22 at a command from power supply control apparatus 22 or periodically at predetermined intervals. The power measuring means and the information communication means may be provided in energy provision equipment 23 or, for example, in the above-described power conditioner. As power measuring means, a well-known electronic-type electric-power sensor with a current transformer and a voltage transformer, for example, may be used. As information communication means, Zigbee (trademark), WiFi (Wireless Fidelity), UWB (Ultra Wide Band), Bluetooth (trademark) or the like, for example, may be used in the case of using wireless communication, and Ethernet (trademark), PLC (Power Line Communication) or the like may be used in the case of using wired communication. While FIGS. 1 and 2 show the configuration example in which consumer 2 is provided with one unit of energy provision equipment 23, consumer 2 may be provided with a plurality of units of energy provision equipment 23. The power measuring means and the information communication means may be provided according to need. It is not necessarily required that the power measuring means and the information communication means be provided on all units of energy provision equipment 23 of consumer 2.

Figure 3:
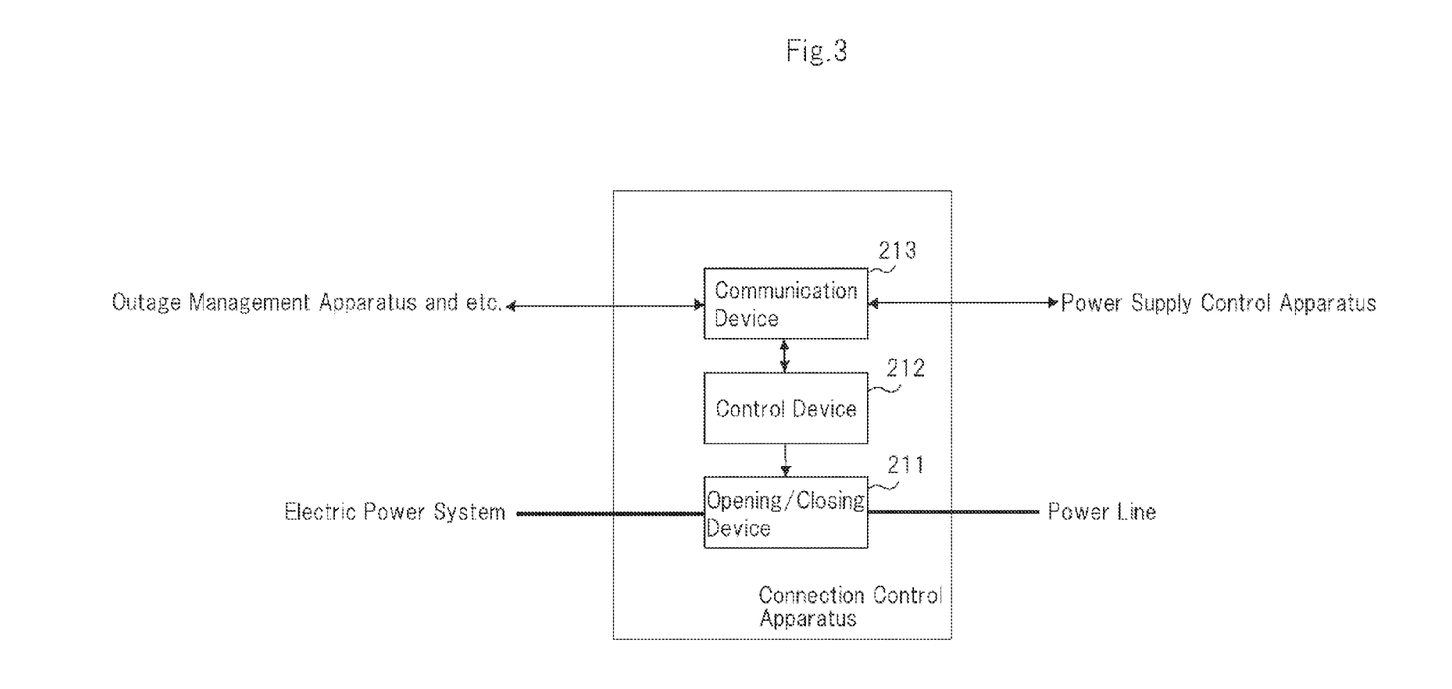
FIG. 3 is a block diagram showing an example of a configuration of a connection control apparatus shown in FIGS. 1 and 2.

As shown in FIG. 3, connection control apparatus 21 shown in FIGS. 1 and 2 includes opening/closing device 211 inserted between an incoming line from the electric power system and the above-described distribution panel, control device 212 that controls the operation of opening/closing device 211, and communication device 213 for communicating information to and from outage management apparatus 1 and power supply control apparatus 22 through a communication line. A watt-hour meter (not illustrated) for measuring the amount of electric power supplied from the electric power system to consumer 2 is ordinarily provided at a connection node between the electric power system and consumer 2. As watt-hour meter, a well-known smart meter, for example, is used. In the case of using a smart meter as watt-hour meter, the watt-hour meter is connected through a communication line to a well-known MDNS (Meter Data Management System) that manages electricity rates or the like with respect to each consumer, and the watt-hour meter notifies the MDMS of the amount of electric power measured periodically at predetermined intervals.

Control device 212 in connection control apparatus 21 can be realized as a well-known LSI or the like including a drive circuit for controlling the operations of a memory and opening/closing device 211, for example. As communication device 213, a device in accordance with a well-known communication protocol using the Internet or a privately used line may be used.

Connection control apparatus 21 shown in FIG. 3 can be realized as a well-known transfer-trip-relay receiver, for example. In a case where the above-described watt-hour meter includes an opening/closing device and control means for controlling the opening/closing device, functions of connection control apparatus 21 can be realized by means of the watt-hour meter.

While FIG. 1 shows a configuration example in which connection control apparatus 21 is connected to outage management apparatus 1 through a privately used line, connection control apparatus 21 and outage management apparatus 1 may transmit and receive information by using well-known wireless communication means. If well-known PLC is used for communication between connection control apparatus 21 and outage management apparatus 1, there is no need for any communication line.

Control device 212 in connection control apparatus 21 sets opening/closing device 211 to "closed" (short) at a command from outage management apparatus 1 when power transmission is performed, and sets opening/closing device 211 to "open" (disconnection) when a power outage occurs in the electric power system. When opening/closing device 211 is "closed" (short), consumer 2 is connected to the electric power system. When opening/closing device 211 is "open" (disconnection), consumer 2 is disconnected from the electric power system. At the time of restoration from a power outage, however, when control device 212 is notified of "outage restoration" from outage management apparatus 1, it transfers "outage restoration" to power supply control apparatus 22 while maintaining opening/closing device 211 in the "open" state. Thereafter, when control device 212 receives from outage management apparatus 1 a "linkage command", which is a command to establish linkage to the electric power system, it changes the opening/closing device 211 to "closed".

If, at the time of restoration from a power outage, a number of units of energy provision equipment 23, such as renewable power sources, are simultaneously linked to the electric power system, the quality of distributed electric power is reduced due to reverse power flows from the units of energy provision equipment 23 and there is a possibility of the system being, at worst, again driven into a power outage. In the arrangement in which, as described above, connection control apparatus 21 changes opening/closing device 211 to "closed" at the stage at which a "linkage command" is notified from outage management apparatus 1 managed by an electric power company or the like, timings of linkages of the units of energy provision equipment 23 held by the consumers to the electric power system can be controlled by outage management apparatus 1. That is, if outage management apparatus 1 performs control so that the units of energy provision equipment 23 are not simultaneously linked to the electric power system, degradation of the quality of distributed electric power due to reverse power flows from the units of energy provision equipment 23 at the time of restoration from a power outage can be limited.

Figure 4:
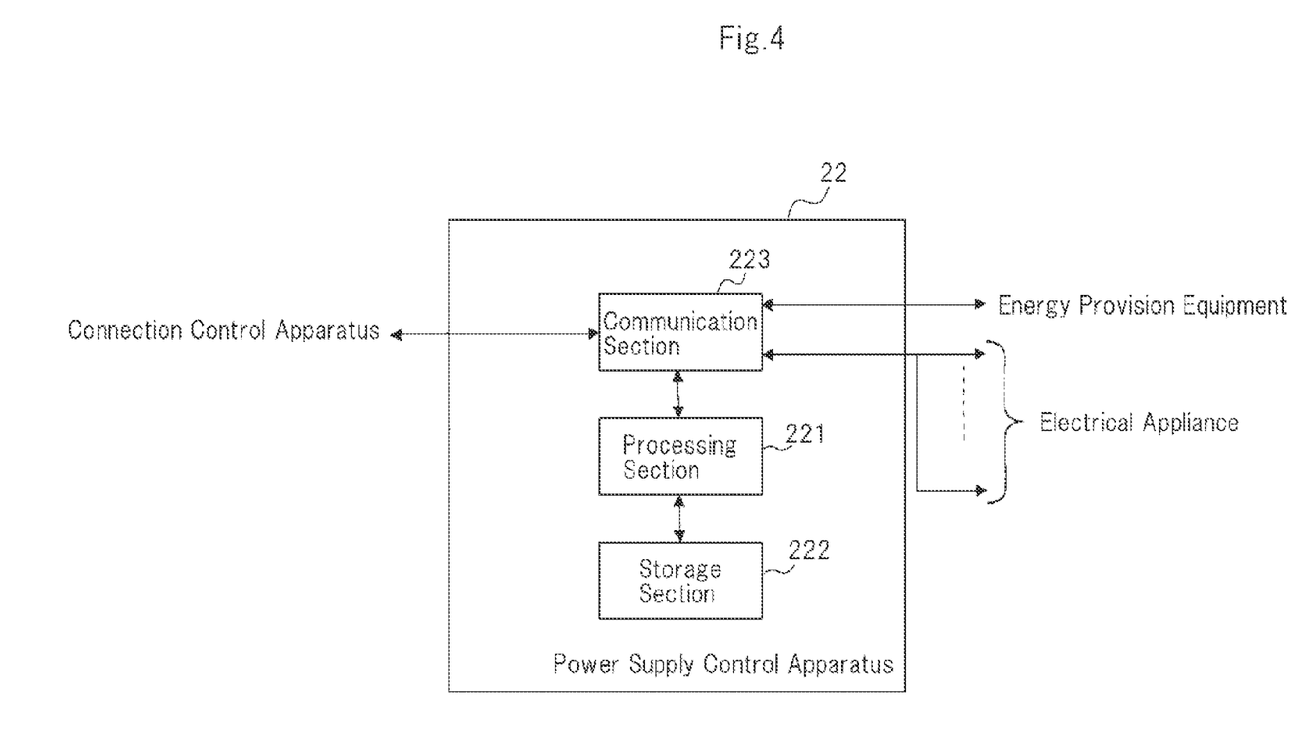
FIG. 4 is a block diagram showing an example of a configuration of a power supply control apparatus shown in FIGS. 1 and 2.

As shown in FIG. 4, power supply control apparatus 22 includes processing section 221, storage section 222 and communication section 223.

Storage section 222 holds information on the amount of electric power that can be output from energy provision equipment 23, the power consumption of each electrical appliance 24 and "the degree of importance" set for each electrical appliance 24 as described below.

Communication section 223 enables communication of information to or from connection control apparatus 21, energy provision equipment 23 and electrical appliances 24. Communication section 223 may use, for example, Zigbee (trademark), WiFi (Wireless Fidelity), UWB (Ultra Wide Band), Bluetooth (trademark) or the like in the case of performing wireless communication of information, and may use Ethernet (trademark), PLC or the like in the case of performing wired communication of information.

Processing section 221 manages supply of electric power from energy provision equipment 23 that consumer 2 owns to electrical appliances 24. For example, when consumer 2 is disconnected from the electric power system by connection control apparatus 21 at a command from outage management apparatus 1, processing section 221 makes energy provision equipment 23 enter an autonomous operation mode to supply electric power to electrical appliances 24. When "outage restoration" is notified from outage management apparatus 1 through connection control apparatus 21, processing section 221 stops the operation with energy provision equipment 23 in the autonomous operation mode and establishes linkage to the electric power system.

Processing section 221 also performs powering on/off of each electrical appliance 24. Powering on/off of electrical appliances 24 may be controlled with respect to each electrical appliance 24 or may be controlled with respect to each receptacle, earth leakage circuit breaker or molded-case circuit breaker. For powering on/off of each electrical appliance 24, if electrical appliance 24 has a function to permit control from the outside, such a function may be used. If electrical appliance 24 has no such function, it may be controlled by providing an opening/closing switch on the power supply line. It is not necessary that processing section 221 perform powering on/off of all electrical appliances 24 that consumer 2 owns. Some of electrical appliances 24 may be exempted from the objects to be controlled.

When a power outage occurs in the electric power system, processing section 221 obtains the value of the amount of electric power providable from energy provision equipment 23, such as a predicted amount of electric power that will be generated from a renewable power source or an amount of electricity stored in a storage battery, and also obtains the power consumption of electrical appliances 24. Then, based on the amount of electric power providable from energy provision equipment 23, the power consumption of electrical appliances 24 and on the degree of importance set for electrical appliances 24 in advance, processing section 221 starts supply of electric power from energy provision equipment 23 to electrical appliances 24 that has a higher degree of importance within a range in which electric power can be provided from energy provision equipment 23.

When processing section 221 receives a "predicted outage time period" from outage management apparatus 1 through connection control apparatus 21, it maintains supply of electric power to electrical appliances 24 that has a higher degree of importance and that is operable according to the predicted outage time period, and stops supply of electric power to the other electrical appliances 24. A predicted amount of power generation, for example, with respect to a solar power generation unit, may be computed by considering the relationship between atmospheric phenomena data on a regional basis and the expected amount of power generation, provided from the manufacturer of the solar power generation unit, a loss due to installation conditions or the like, and other factors. If a public institution, a company or the like that provides a predicted amount of power generation exists, the predicted amount of power generation may be obtained from the institution, company or the like through a communication line in the Internet or the like. The arrangement may alternatively be such that a database is prepared by obtaining and storing the value of the amount of power generation from the renewable power source periodically at predetermined intervals through power supply control apparatus 22, and a predicted amount of power generation is determined based on the database. In such a case, an amount of power generation in a past time period matching or close to the weather condition in the predicted outage time period may be set as a predicted amount of power generation. An amount of electricity stored in a storage battery may be obtained from the power conditioner that controls charge and discharge of the storage battery. A predicted amount of power generation or an amount of stored electricity may be obtained when a predicted outage time period is received or may be periodically obtained and stored (updated) at intervals set in advance.

Further, when processing section 221 in power supply control apparatus 22 receives "outage restoration" from outage management apparatus 1 through connection control apparatus 21 and stops the autonomous operation with energy provision equipment 23, it notifies outage management apparatus 1 of "linkage ready" through connection control apparatus 21, and notifies outage management apparatus 1 of "linkage operation time" indicating the time period from receiving the above-mentioned "linkage command" to actually enabling linkage of energy provision equipment 23 to the electric power system and "predicted amount of reverse power flow" indicating the amount of electric power of a reverse power flow to the electric power system that is expected to be caused at the time of linkage.

The linkage operation time is a time period required for processing (including frequency adjustment and phase adjustment) from connecting energy provision equipment 23 to the electric power system to enabling the linked operation of energy provision equipment 23. The linkage operation time may be set in advance, for example, according to the characteristics of energy provision equipment 23 and the power conditioner. As the predicted amount of reverse power flow, a surplus amount of electric power (predicted value) computed from the predicted amount of power generated from the renewable power source at the time of linkage and a predicted total power consumption of electrical appliances 24 at the time of linkage may be used.

In this case, when outage management apparatus 1 receives the "linkage operation time" and "predicted amount of reverse power flow" through connection control apparatus 21, it schedules a time to establish linkage to the electric power system for each consumer based on the "linkage operation time" and "predicted amount of reverse power flow" and transmits "linkage command" to connection control apparatus 21 of consumer 2 according to the scheduled time. At this time, outage management apparatus 1 may schedule the time in the linkage command to be transmitted to connection control apparatus 21 in each consumer 2 so that the adjustment load on the electric power system is minimized, for example, the amount of adjustment of power generation by an adjusting power source (a thermal power plant or the like) necessary for stabilizing the distributed voltage and the distributed frequency is minimized.

Figure 5:
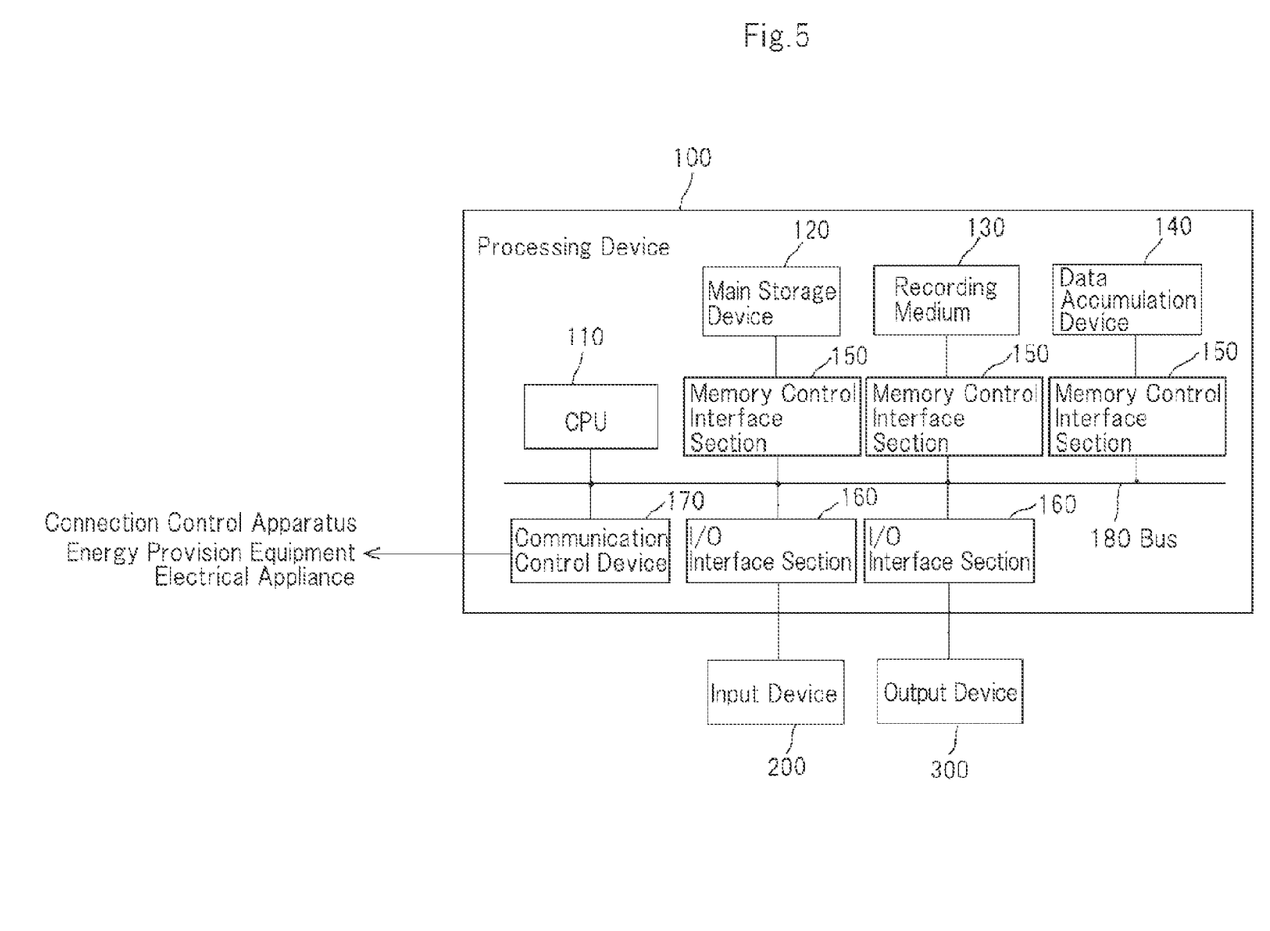
FIG. 5 is a block diagram showing an example of a configuration of an information processor for realizing the power supply control apparatus shown in FIGS. 1 and 2.

Power supply control apparatus 22 shown in FIG. 4 can be realized, for example, by means of an information processor (computer) shown in FIG. 5. FIG. 5 is a block diagram showing an example of a configuration of an information processor for realizing the power supply control apparatus shown in FIGS. 1 and 2.

The information processor shown in FIG. 5 includes processing device 100 that executes predetermined processing in accordance with a program, input device 200 for inputting commands, information and the like to processing device 100, and output device 300 for outputting the results of processing in processing device 100.

Input device 200 is, for example, a keyboard or a pointing device such as a mouse, a touch pad or a touch panel.

Output device 300 includes a display device such as a liquid crystal display and a printing device such as a printing machine.

Processing device 100 includes CPU 110, main storage device 120 that temporarily holds information necessary for processing in CPU 110, recording medium 130 on which a program for making CPU 110 execute the processing according to the present invention is recorded, data accumulation device 140 that stores information, for example, on the amount of electric power providable from energy provision equipment 23, the power consumptions of electrical appliances 24 and "the degrees of importance" of electrical appliances 24, memory control interface section 150 that controls data transfer with respect to main storage device 120, recording medium 130 and data accumulation device 140, I/O interface section 160, which is a device for interfacing with input device 200 and output device 300, and communication control device 170 for communication of information to or from connection control apparatus 21 and electrical appliances 24 through the communication line. These components are connected through a bus 180.

Processing device 100 executes processing in accordance with the program recorded on recording medium 130 to realize a power connection control method described in the description of the present exemplary embodiment. Recording medium 130 may be a magnetic disk, a semiconductor memory, an optical disk or any other recording medium. It is not necessary to provide data accumulation device 140 in processing device 100. Data accumulation device 140 may be an independent device. Functions of processing section 221 shown in FIG. 4 are realized by means of processing device 100 shown in FIG. 5; functions of storage section 222 shown in FIG. 4 are realized by means of data accumulation device 140; and functions of communication section 223 shown in FIG. 4 are realized by means of communication control device 170.

Figure 6:
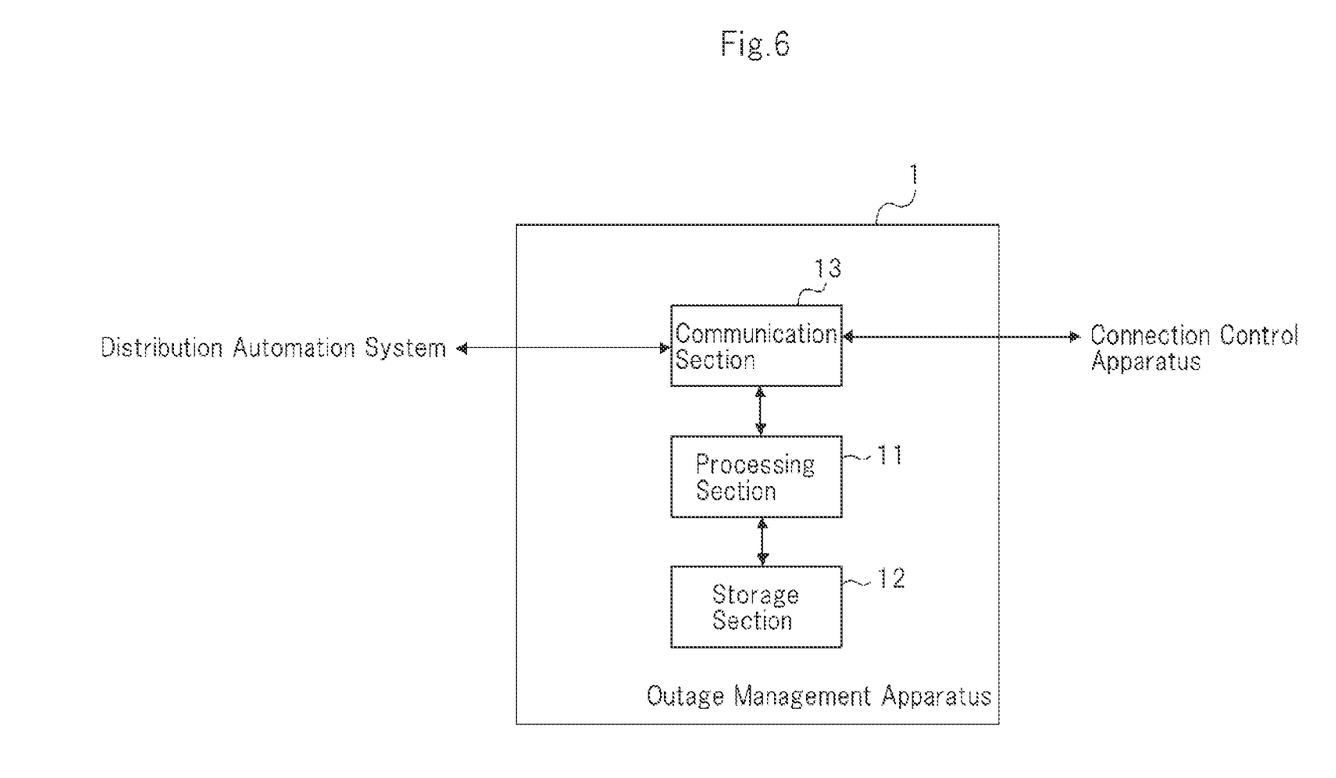
FIG. 6 is a block diagram showing an example of a configuration of an outage management apparatus shown in FIG. 1.

As shown in FIG. 6, outage management apparatus 1 includes processing section 11, storage section 12 and communication section 13.

To outage management apparatus 1, a distribution automation system (not illustrated) that controls, for example, the operation of the electric power system is connected through a communication line. When a power outage in the electric power system occurs, "outage section information" indicating a distribution section where the power outage is occurring and "system consumer accommodation information" indicating consumers 2 accommodated in the electric power system are provided from the distribution automation system through communication section 13. "Outage section information" and "system consumer accommodation information" provided from the distribution automation system are stored in storage section 12. The distribution automation system is described, for example, in "Internet electric power lecture for university students", 4. Power distribution techniques, Distribution automation system (Internet URL: http://www.tepco.co.jp/kouza/haiden/haiden-j.html).

When a power outage occurs in the electric power system, processing section 11 in outage management apparatus 1 obtains the current "outage section information" from the above-described distribution automation system, extracts consumers 2 accommodated in the outage section based on "system consumer accommodation information" provided from the distribution automation system, and transmits "parallel-off command" to connection control apparatus 21 for extracted consumers 2 through communication section 13 to make connection control apparatus 21 perform disconnection (paralleling off) from the electric power system. At this time, processing section 11 transmits information on an expected outage time period (predicted outage time period) to power supply control apparatus 22 through connection control apparatus 21. As predicted outage time period at this stage, a value from past actual restoration time periods corresponding to details of accidents prepared as a database by the electric power company, for example, may be used. Outage management apparatus 1 is arranged so that a predicted outage time period corresponding to the last restored state can be input to outage management apparatus 1 by the operator of outage management apparatus 1. When the predicted outage time period is updated by the operator, processing section 11 in outage management apparatus 1 transmits this predicted outage time period to connection control apparatuses 21 that consumer 2 owns in the outage section.

When the electric power system is restored from the power outage that has occurred in the electric power system, processing section 11 in outage management apparatus 1 notifies connection control apparatuses 21 for consumers 2, to which the above-mentioned "parallel-off command" has been transmitted, of "outage restoration" indicating restoration from the outage, and thereafter transmits "linkage command" to establish linkage to the electric power system.

Outage management apparatus 1 can be realized, for example, by means of the information processor (computer) shown in FIG. 5, as in the case of power supply control apparatus 22. In a case where outage management apparatus 1 is realized by means of the information processor, functions of processing section 11 shown in FIG. 6 are realized by means of processing device 100 shown in FIG. 5; functions of storage section 12 shown in FIG. 6 are realized by means of data accumulation device 140; and functions of communication section 13 shown in FIG. 6 are realized by means of communication control device 170. For input of a predicted outage time period by the operator of outage management apparatus 1, input device 200 shown in FIG. 5 may be used.

In this arrangement, information on the degrees of importance of electrical appliances 24 set by consumer 2 in advance is stored in power supply control apparatus 22. The degree of importance is set in a plurality of steps. The highest degree of importance may be set, for example, for a security system, disaster prevention equipment such as emergency lights, fire-fighting facilities, or the like. Other degrees of importance may be attached to electrical appliances 24 in order of decreasing priority with which consumer 2 wants to operate in the event of a power outage. Electrical appliances 24 to which the highest degree of importance is attached are assumed to include the above-described power supply control apparatus 22, connection control apparatus 21, and the power conditioner provided on energy provision equipment 23. It is not necessarily required that the degree of importance be attached to each electrical appliance 24. For example, the degree of importance may be set with respect to each receptacle or with respect to each earth leakage circuit breaker or molded-case circuit breaker, or may be set with respect to each of predetermined areas including a plurality of loads (electrical appliances) or each of predetermined places. For example, in a case where consumer 2 is formed of commercial facilities or hotel facilities having a plurality of floors, a higher degree of importance may be set for lights in an emergency stair case, emergency lights on common passageways on the floors, or the like.

Power supply control apparatus 22 is assumed to collect, by predetermined timing or periodically, the values of the power consumptions of electrical appliances 24 and the amount of electric power providable from energy provision equipment 23, and store the collected values in storage section 222.

Figure 7:
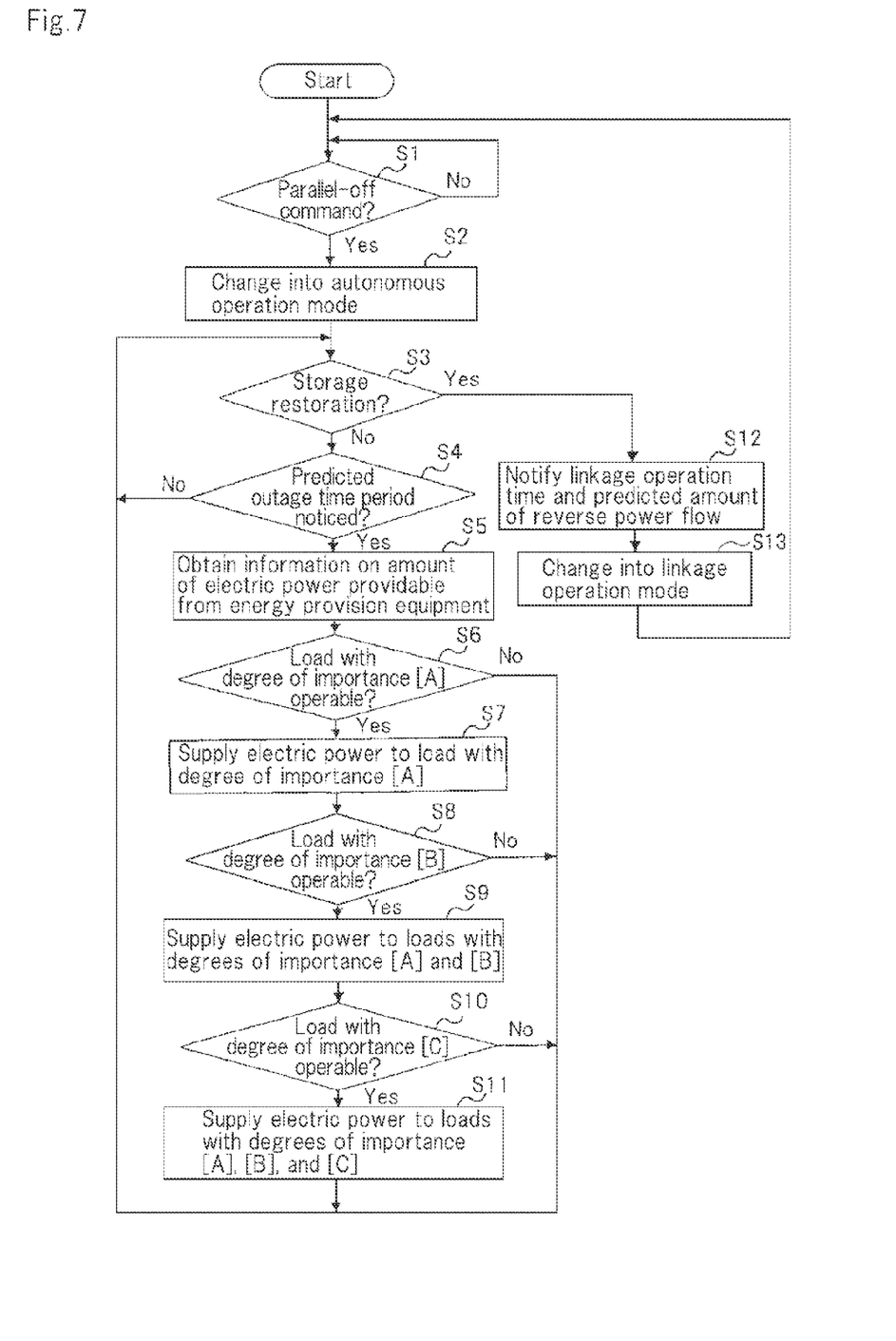
FIG. 7 is a flowchart showing an example of a sequence of process steps in the power supply control apparatus shown in FIGS. 1 and 2.

FIG. 7 is a flowchart showing an example of a sequence of process steps in the power supply control apparatus shown in FIGS. 1 and 2.

FIG. 7 shows an example of setting degrees of importance in which three degrees of importance: the highest degree of importance [A], the next degree of importance [B] and the lowest degree of importance [C] are set for electrical appliances 24 in advance. The number of degrees of importance attached to electrical appliances 24 is not limited to three. Any number of degrees of importance, not smaller than two, may be set. Processing in power supply control apparatus 22 described below is executed in processing section 221 shown in FIG. 4.

As described above, when a power outage occurs in the electric power system, connection control apparatus 21 sets opening/closing device 211 to "open" at "parallel-off command" from outage management apparatus 1, for example. Connection control apparatus 21 also notifies power supply control apparatus 22 of the parallel-off state from the electric power system and transfers a "predicted outage time period" received from outage management apparatus 1 to power supply control apparatus 22. When connection control apparatus 21 receives an updated "predicted outage time period" from outage management apparatus 1 during the power outage, it transfers the "predicted outage time period" to power supply control apparatus 22.

On the other hand, when connection control apparatus 21 is notified of "outage restoration" from outage management apparatus 1 at the time of restoration from the power outage, it transfers "outage restoration" to power supply control apparatus 22 while maintaining opening/closing device 211 in the "open" state. Thereafter, when "linkage command" is transmitted from outage management apparatus 1, connection control apparatus 21 sets opening/closing device 211 to "closed" and notifies power supply control apparatus 22 of linkage to the electric power system.

As shown in FIG. 7, power supply control apparatus 22 determines whether or not the parallel-off command has been notified from connection control apparatus 21 (step S1), and repeats processing in step S1 if the parallel-off command has not been notified. When the parallel-off command is notified from the electric power system (e.g., outage management apparatus 1), power supply control apparatus 22 changes energy provision equipment 23 into the autonomous operation mode (step S2).

When energy provision equipment 23 is in the autonomous operation mode, power supply control apparatus 22 first determines whether or not the outage restoration has been notified (step S3). When the outage restoration is notified, the process proceeds to processing in step S12.

If the outage restoration has not been notified, power supply control apparatus 22 determines whether or not a predicted outage time period or an updated predicted outage time period has been notified (step S4). If no predicted outage time period or updated predicted outage time period has been notified, processing from step S3 is repeated.

If a predicted outage time period or an updated predicted outage time period has been notified, power supply control apparatus 22 obtains information on the amount of electric power providable from energy provision equipment 23 in the predicted outage time period, e.g., a predicted amount of power generation from the renewable power source or an amount of electricity stored in the storage battery (step S5).

Next, power supply control apparatus 22 compares the amount of electric power providable from energy provision equipment 23 in the predicted outage time period and the total amount of electric power to be consumed by the load or loads (electrical appliances 24) with the degree of importance [A] in the predicted outage time period to determine whether or not electrical appliances 24 with the degree of importance [A] can be operated within the predicted outage time period (step S6). If electrical appliances 24 with the degree of importance [A] can be operated, electric power is supplied to the same electrical appliances (step S7), and the process proceeds to processing in step S8.

If electrical appliances 24 with the degree of importance [A] cannot be operated, power supply control apparatus 22 repeats processing from step S3 without executing supply of electric power from energy provision equipment 23 to electrical appliances 24 with the degree of importance [A]. Even in the case where electrical appliances 24 with the degree of importance [A] cannot be operated through the predicted outage time period, they may be operated within a time period in which electric power can be supplied from energy provision equipment 23.

In step S8, power supply control apparatus 22 compares the amount of electric power providable from energy provision equipment 23 in the predicted outage time period and the total amount of electric power to be consumed by electrical appliances 24 with the degrees of importance [A] and [B] in the predicted outage time period to determine whether or not electrical appliances 24 with the degrees of importance [A] and [B] can be operated within the predicted outage time period. If electrical appliances 24 with the degrees of importance [A] and [B] can be operated, electric power is supplied to the same electrical appliances (step S9), and the process proceeds to processing in step S10.

If electrical appliances 24 with the degrees of importance [A] and [B] cannot be operated, power supply control apparatus 22 repeats processing from step S3 without executing supply of electric power from energy provision equipment 23 to electrical appliances 24 with the degree of importance [B].

In step S10, power supply control apparatus 22 compares the amount of electric power providable from energy provision equipment 23 in the predicted outage time period and the total amount of electric power to be consumed by electrical appliances 24 with the degrees of importance [A], [B], and [C] in the predicted outage time period to determine whether or not electrical appliances 24 with the degrees of importance [A], [B], and [C] can be operated within the predicted outage time period. If electrical appliances 24 with the degrees of importance [A], [B], and [C] can be operated, electric power is supplied to the same electrical appliances (step S11), and the process proceeds to processing in step S3.

If electrical appliances 24 with the degrees of importance [A], [B], and [C] cannot be operated, power supply control apparatus 22 repeats processing from step S3 without executing supply of electric power from energy provision equipment 23 to electrical appliances 24 with the degree of importance [C].

When, in step S4, power supply control apparatus 22 receives an updated predicted outage time period from connection control apparatus 21, repeats processing in the above-described steps S5 to S11 to execute supply of electric power to electrical appliances 24 having higher degrees of importance operable within the predicted outage time period on the basis of the amount of electric power providable from energy provision equipment 23 at the current point in time.

When, in step S3, "outage restoration" is notified from outage management apparatus 1 through connection control apparatus 21, power supply control apparatus 22 stops energy provision equipment 23 in the autonomous operation mode, notifies outage management apparatus 1 of "linkage ready" through connection control apparatus 21, and notifies outage management apparatus 1 of "linkage operation time" indicating the time period from receiving the above-mentioned "linkage command" to actually enabling linkage of energy provision equipment 23 to the electric power system and "predicted amount of reverse power flow" indicating the amount of electric power of a reverse power flow to the electric power system that is expected to be caused at the time of linkage (step S12).

Thereafter, when "linkage command" is notified from outage management apparatus 1, power supply control apparatus 22 enters a linked operation mode (step S13) and thereafter repeats processing from step S1.

In the present exemplary embodiment, when a power outage occurs in the electric power system, connection control apparatus 21 sets opening/closing device 211 to "open" at the parallel-off command from outage management apparatus 1 to disconnect energy provision equipment 23 from the electric power system. At the time of restoration from the power outage, connection control apparatus 21 sets opening/closing device 211 to "closed" at the linkage command from outage management apparatus 1 to link energy provision equipment 23 to the electric power system, thus enabling automatic switching between the autonomous operation and the linked operation of energy provision equipment 23. Thus, the autonomous operation of energy provision equipment 23 in a power outage is enabled while the need for a burdensome switching operation at the time of occurrence of the power outage and at the time of restoration from the power outage is eliminated.

Power supply control apparatus 22 starts the autonomous operation of energy provision equipment 23 after disconnection from the electric power system made by connection control apparatus 21 in a power outage in the electric power system. When the electric power system is restored from the power outage, power supply control apparatus 22 links energy provision equipment 23 to the electric power system after establishing connection with the electric power system, so that no adverse influence on the electric power system is caused.

Thus, adverse influence on the electric power system can be reduced while switching of the autonomous operation function with energy provision equipment 23 performed by consumer 2 at the time of occurrence of a power outage and at the time of restoration from the power outage is facilitated.

Further, outage management apparatus 1 can schedule, at the time of restoration from the power outage, a time for a linkage command to be transmitted to connection control apparatus 21 for each consumer 2 based on a linkage operation time and a predicted amount of reverse power flow transmitted from power supply control apparatus 22 so that the load on the electric power system is minimized, for example, the amount of adjustment of power generation by an adjusting power source (a thermal power plant or the like) necessary for stabilizing the distributed voltage and the distributed frequency is minimized, thus enabling linkage of energy provision equipment 23 for each consumer 2 while reducing the adjustment load on the electric power system.

The present invention has been described by referring to the exemplary embodiment thereof. However, the present invention is not limited to the above-described exemplary embodiment. Various changes and modifications understandable by those skilled in the art can be made in the configuration and details of the present invention within the scope of the present invention.

This application is based upon and claims the benefit of priority from the prior Japanese Patent Application No. 2011-209371, field on Sep. 26, 2011; the entire contents of which are incorporated therein by reference.

The invention claimed is:

1. A power connection control system configured to function in conjunction with energy provision equipment to be linked to an electric power system, the energy provision equipment configured to supply electric power to electrical appliances that a consumer owns, the power connection control system comprising:
 a connection control apparatus comprising an opening/closing device capable of connecting or disconnecting the electric power system and the consumer, and that, when a power outage occurs in the electric power system, disconnects the electric power system and the consumer from each other by the opening/closing device based on a command received from outside; and
 a power supply control apparatus that, when the power outage occurs in the electric power system, supplies electric power from the energy provision equipment to the electrical appliances;
 an outage management apparatus that, when the power outage occurs in the electric power system, transmits to said connection control apparatus a parallel-off command for disconnecting the electric power system and the consumer from each other, and, at the time of restoration from the power outage, transmits to said connection control apparatus a linkage command for linking the electric power system and the consumer to each other,
 wherein said connection control apparatus, when restoration of power from the power outage in an electric power system is detected, transmits to said outage management apparatus a linkage operation time representing the time from receiving a linkage command, for linking the consumer to the electric power system, to enabling linkage of the units of energy provision equipment with the electric power system and a predicted amount of reverse power flow representing a surplus amount of electric power computed from a predicted amount of electric power generated from the energy provision equipment at the time of linkage and a predicted total power consumption of the electrical appliances at the time of linkage,
 wherein said outage management apparatus schedules a time to transmit the linkage command for each consumer based on the linkage operation time and the predicted amount of reverse power flow, and transmits the linkage command to said connection control apparatus according to the scheduled time.

2. The power connection control system according to claim 1, wherein when the power outage occurs in the electric power system, said power supply control apparatus obtains an amount of electric power providable from the energy provision equipment and power consumption of the electrical appliances, and supplies electric power from the energy provision equipment to part of the electrical appliances having a higher degree of importance within a range in which electric power can be provided from the energy provision equipment, based on the amount of electric power providable from the energy provision equipment and the power consumption of the electrical appliances obtained and degree of importance set for the electrical appliances in advance.

3. The power connection control system according to claim 1, wherein, at the time of restoration from the power outage in the electric power system, said connection control apparatus connects the electric power system and the consumer to each other by the opening/closing device based on a command received from the outside.

4. The power connection control system according to claim 3,
 wherein said connection control apparatus disconnects the electric power system and the consumer from each other by the opening/closing device at the parallel-off command, and connects the electric power system and the consumer to each other by the opening/closing device at the linkage command, and
 wherein upon receiving the predicted outage time period through said connection control apparatus, said power supply control apparatus determines to which of the electrical appliances the electric power is to be supplied based on the amount of electric power providable from the energy provision equipment in the predicted outage time period, the power consumption of the electrical appliances in the predicted outage time period and the degree of importance of the electrical appliances.

5. The power connection control system according to claim 1, wherein, when the predicted outage time period is updated by an operator, said outage management apparatus transmits the updated predicted outage time period to said connection control apparatus.

6. The power connection control system according to claim 1, wherein
 said connection control apparatus causes connection to be made from the consumer to the electric power system, and, after a lapse of the linkage operation time, causes electric power to be supplied from the units of energy provision equipment to the electric power system.

7. The power connection control system according to claim 1, wherein
 said connection control apparatus performs frequency adjustment and phase adjustment after the consumer is connected to the electric power system, and causes electric power to be supplied from the units of energy provision equipment to the electric power system.

8. The power connection control system according to claim 1, wherein
 said connection control apparatus, when the linkage command is received at a time for establishing linkage which is determined on the basis of the linkage operation time and the predicted amount of reverse power flow, causes electric power to be supplied from the units of energy provision equipment to the electric power system.

9. A power connection control method for disconnecting, from an electric power system, energy provision equipment that can supply electric power to electrical appliances that a consumer owns, the method comprising:
providing an opening/closing device that connects or disconnects the electric power system and the consumer;
a control apparatus disconnecting, when a power outage occurs in the electric power system, the electric power system and the consumer from each other by the opening/closing device based on a command received from the outside; and
a first computer supplying electric power from the energy provision equipment to the electrical appliances during the power outage in the electric power system, and
when restoration of power from the power outage in an electric power system is detected, transmitting a linkage operation time representing the time from receiving a linkage command, for linking the consumer to the electric power system, to enabling linkage of the units of energy provision equipment with the electric power system and a predicted amount of reverse power flow representing a surplus amount of electric power computed from a predicted amount of electric power generated from the energy provision equipment at the time of linkage and a predicted total power consumption of the electrical appliances at the time of linkage,
when the power outage occurs in the electric power system, a second computer transmitting to a connection control apparatus a parallel-off command for disconnecting the electric power system and the consumer from each other, and, at the time of restoration from the power outage, transmitting to the control apparatus a linkage command for linking the electric power system and the consumer to each other, and
said second computer scheduling a time to transmit the linkage command for each consumer based on the linkage operation time and the predicted amount of reverse power flow, and transmitting the linkage command to said connection control apparatus according to the scheduled time.

10. The power connection control method according to claim 9, wherein when the power outage occurs in the electric power system, the first computer obtains an amount of electric power providable from the energy provision equipment and power consumption of the electrical appliances, and supplies electric power from the energy provision equipment to part of the electrical appliances with a higher degree of importance within a range in which electric power can be provided from the energy provision equipment, based on the amount of electric power providable from the energy provision equipment and the power consumption of the electrical appliances obtained and degree of importance set for the electrical appliances in advance.

11. The power connection control method according to claim 9, wherein, at the time of restoration from the power outage in the electric power system, the first computer connects the electric power system and the consumer to each other by the opening/closing device based on a command received from the outside.

12. The power connection control method according to claim 11 wherein the control apparatus disconnects the electric power system and the consumer from each other by the opening/closing device at the parallel-off command, and connects the electric power system and the consumer to each other by the opening/closing device at the linkage command, and
wherein upon receiving the predicted outage time period through the control apparatus, the first computer determines to which of the electrical appliances the electric power is to be supplied based on the amount of electric power providable from the energy provision equipment in the predicted outage time period, the power consumption of the electrical appliances in the predicted outage time period and the degree of importance of the electrical appliances.

13. The power connection control method according to claim 9, wherein, when the predicted outage time period is updated by an operator, the second computer transmits the updated predicted outage time period to the control apparatus.

14. The power connection control method according to claim 9, wherein
said first computer causing connection to be made from the consumer to the electric power system, and, after a lapse of the linkage operation time, causing electric power to be supplied from the units of energy provision equipment to the electric power system.

15. The power connection control method according to claim 9, wherein
said first computer performs frequency adjustment and phase adjustment after the consumer is connected to the electric power system, and causes electric power to be supplied from the units of energy provision equipment to the electric power system.

16. The power connection control method according to claim 9, wherein said first computer, when the linkage command is received at a time for establishing linkage which is determined on the basis of the linkage operation time and the predicted amount of reverse power flow, causes electric power to be supplied from the units of energy provision equipment to the electric power system.

17. A power supply control apparatus that supplies electric power from energy provision equipment that can supply electric power to electrical appliances that a consumer owns, the apparatus comprising:
a processing section that when a power outage occurs in an electric power system supplies electric power from the energy provision equipment to part of the electrical appliances within a range in which electric power can be provided from the energy provision equipment; and
a communication section that communicates information to or from the energy provision equipment and the electrical appliances,
wherein said processing section, when restoration of power from the power outage in an electric power system is detected, transmits a linkage operation time representing the time from receiving a linkage command, for linking the consumer to the electric power system, to enabling linkage of the units of energy provision equipment with the electric power system and a predicted amount of reverse power flow representing a surplus amount of electric power computed from a predicted amount of electric power generated from the energy provision equipment at the time of linkage and a predicted total power consumption of the electrical appliances at the time of linkage, and receives the linkage command for each consumer which is scheduled based on the linkage operation time and the predicted amount of reverse power flow.

18. The power supply control apparatus according to claim 17, wherein upon receiving a predicted outage time period from the outside in a power outage in the electric power system, said processing section determines to which of the electrical appliances the electric power is to be supplied based on the amount of electric power providable from the energy provision equipment in the predicted outage time period, the power consumption of the electrical appliances in the predicted outage time period and the degree of importance of the electrical appliances.

19. The power supply control apparatus according to claim 17, wherein
said processing section causes connection to be made from the consumer to the electric power system, and, after a lapse of the linkage operation time, causes electric power to be supplied from the units of energy provision equipment to the electric power system.

20. The power supply control apparatus according to claim 17, wherein
said processing section performs frequency adjustment and phase adjustment after the consumer is connected to the electric power system, and causes electric power to be supplied from the units of energy provision equipment to the electric power system.

21. The power supply control apparatus according to claim 17, wherein
said processing section, when the linkage command is received at a time for establishing linkage which is determined on the basis of the linkage operation time and the predicted amount of reverse power flow, causes electric power to be supplied from the units of energy provision equipment to the electric power system.

22. An outage management apparatus comprising:
a storage section that, when a power outage occurs in an electric power system, stores outage section information provided from outside and indicates a distribution section where the power outage is occurring, and stores system consumer accommodation information as information indicating consumers accommodated in the electric power system;
a processing section that extracts some of the consumers accommodated in the outage section where the power outage is occurring based on at least one of the outage section information and the system consumer accommodation information, transmits to the extracted consumer a parallel-off command for disconnecting the extracted consumers in the outage section from the electric power system and transmits a predicted outage time period input by an operator as a predicted value of an outage time period, and transmits to the extracted consumers in the outage section a linkage command for linking the extracted consumers to the electric power system at the time of restoration from the power outage; and
a communication section that, under the control of said processing section, receives the outage section information and the system consumer accommodation information through a predetermined communication line, and transmits the parallel-off command and the linkage command to the extracted consumers accommodated in the distribution section where the power outage is occurring,
wherein when said processing section receives, from the extracted consumers, with respect to a notice of restoration from the power outage, a linkage operation time representing the time from receiving the linkage command to enabling linkage of units of energy provision equipment with the electric power system and a predicted amount of reverse power flow representing a surplus amount of electric power computed from a predicted amount of electric power generated from the energy provision equipment at the time of linkage and a predicted total power consumption of the extracted consumer's electrical appliances at the time of linkage, said processing section schedules a time to transmit the linkage command for each of the extracted consumers based on the linkage operation time and the predicted amount of reverse power flow, and transmits the linkage command to the extracted consumers according to the scheduled time.

23. The outage management apparatus to claim 22, wherein
said processing section schedules the time to transmit the linkage command for each of the extracted consumers so that the adjustment load on the electric power system is minimized.

24. The outage management apparatus to claim 22, wherein
said communication section, when the linkage operation time and the predicted amount of reverse power flow, that are transmitted from the units of energy provision equipment in response to the restoration of power from the power outage, is received, transmits each linkage command to the consumer.

* * * * *